March 14, 1933.  N. SWINDIN  1,901,785
APPARATUS COMPRISING SIPHONS
Filed June 24, 1930  2 Sheets-Sheet 1

Inventor
N. Swindin
By Marks Clark
Attys.

March 14, 1933.   N. SWINDIN   1,901,785
APPARATUS COMPRISING SIPHONS
Filed June 24, 1930    2 Sheets-Sheet 2

Inventor
N. Swindin
By Marks & Clerk
Attys.

Patented Mar. 14, 1933

1,901,785

UNITED STATES PATENT OFFICE

NORMAN SWINDIN, OF ACTON, LONDON, ENGLAND

APPARATUS COMPRISING SIPHONS

Application filed June 24, 1930, Serial No. 463,517, and in Great Britain January 6, 1930.

This invention relates to siphons or apparatus comprising siphons of the type described in my patent specification No. 1,752,620 and comprising a down flow pipe having a bucket to carry a liquid seal for the lower end of said pipe, connected to a bell which is inverted over the upper end of the down flow pipe so as to constitute the up flow pipe, means being provided permitting the lowering of the bucket and inverted bell to reduce the air pressure in the pipe and thereby prime the siphon.

The present invention is concerned more particularly with such apparatus when arranged for use as a liquid meter and has for its object to provide various improvements whereby greater accuracy and speed in operation is obtained.

According to one feature of the present invention, in an apparatus of the type described, the measuring vessel or tank is provided with a lid or closure and means comprising a tube or conduit open to atmosphere extend into the vessel, the end of the tube within the vessel being adapted to be shut off by the rising liquid so that the quantity of liquid in the vessel necessary to provide the required head of liquid in the bucket may be determined with great accuracy.

The tube may be adjustable to vary the quantity measured as desired.

According to a further feature the inlet valve which preferably comprises a double beat equilibrium valve is operated in such a manner that instantaneous closing of the valve is obtained.

The valve is operable by means of a weight, being held open by a trip device which is released by the counterbalance arm when the weight of the bucket overcomes the counterbalance weight.

According to a further feature, means are provided adapted to provide a force assisting the action of the bucket when the beam becomes unbalanced and siphonic action commences in order to provide a quick action of the beam.

Preferably, index means are provided adapted to control locking means, after the apparatus has functioned a predetermined number of times.

Further features of invention will be hereinafter described.

Figure 1:
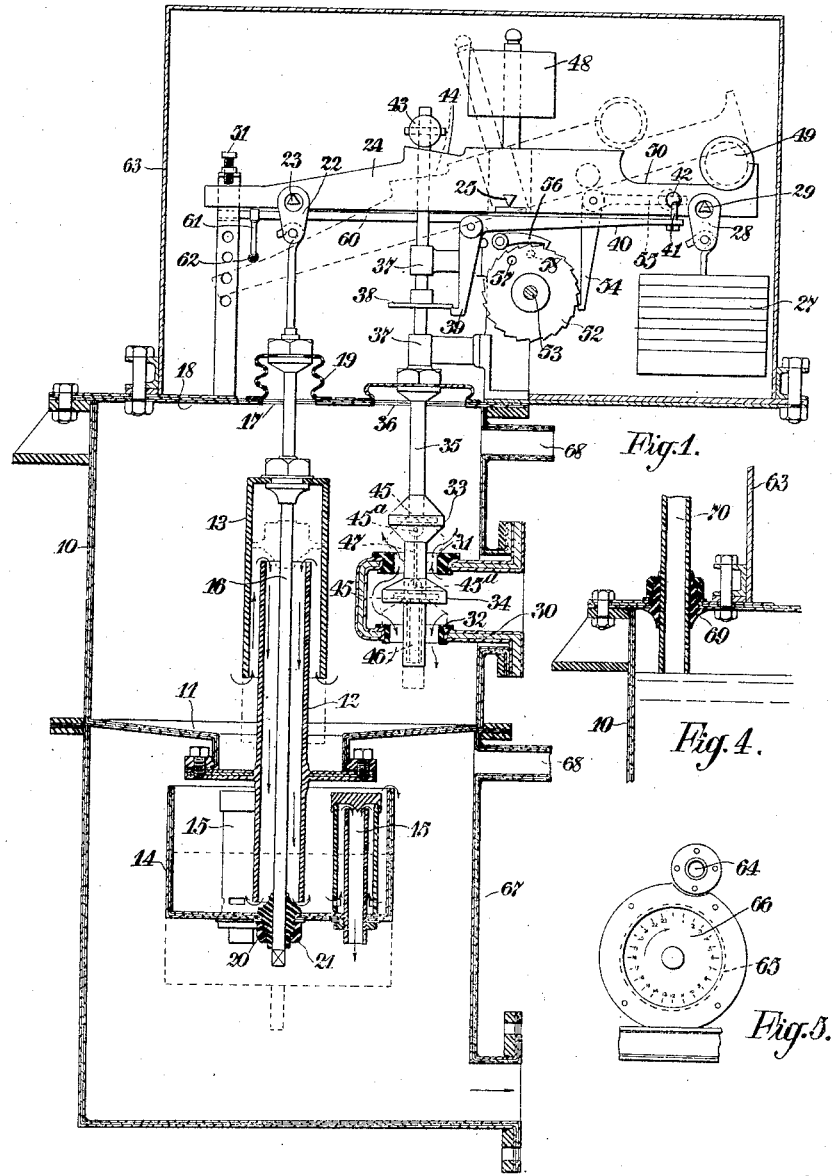
Figure 2:
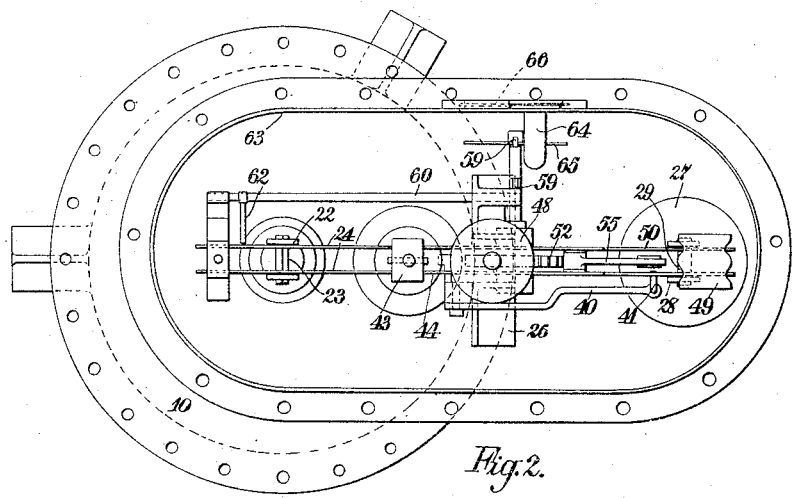
Figure 3:
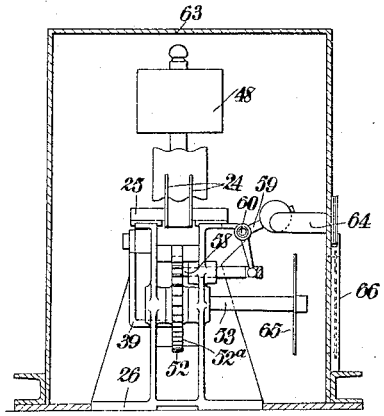
Figure 6:
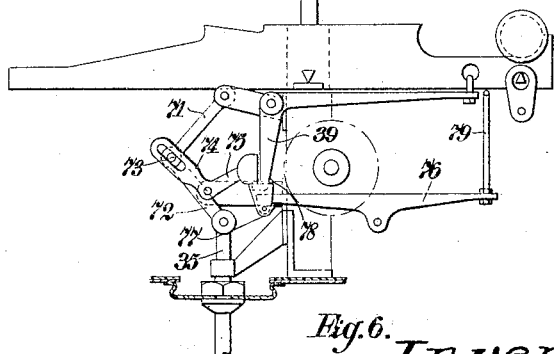

In the accompanying drawings which illustrate a siphonic metering apparatus suitable for controlling the supply of acid solutions, Figure 1 is a part sectional elevation;
Figure 2 is an outside plan with the cover removed;
Figure 3 is an end elevation with certain parts removed;
Figure 4 is a view showing an arrangement of the feature of the tube open to atmosphere;
Figure 5 is a view of a detail, while
Figure 6 is a view showing a modified valve actuating gear.

In carrying the invention into effect as applied to a liquid meter for use, for example, in delivering measured quantities of acid solutions, the tank or measuring vessel 10 which may be circular in cross section is provided on the lower wall 11 with a down flow pipe 12 the upper end of which located within the tank, has associated therewith an inverted bell 13 which is coupled to a bucket 14 enclosing the lower end of the down flow pipe, the bell and bucket thus moving together as one. The bucket 14 is also provided with a siphon device for emptying the bucket. Preferably three siphons 15 are provided for this purpose. These parts are arranged to operate as disclosed in my British specification referred to.

The inverted bell 13 and bucket 14 are connected together by a rod 16 which extends upwardly from the inverted bell and through a port or aperture 17 in the upper closed wall 18 of the measuring tank 10, the port being closed by a suitable diaphragm 19, such as rubber, to which the rod is connected so that an air-tight joint is provided. The connections between the rod 16 and the parts associated therewith are in the from of chucks 20 adapted to be gripped upon the rod by screw caps 21 whereby a ready means of adjustment is provided. The chucks and caps are preferably formed of moulded rubber. The outer end of the rod 16 is connected to links 22 which hang upon knife edges 23 carried by a counterbalance lever or beam 24 which extends diametrically across the tank and is fulcrumed by knife edges 25 on a bracket 26 mounted above the tank. The lever on the other side of its fulcrum is provided with a weight 27 which may comprise a number of discs mounted on a suitable support carried by links 28 suspended on knife edges 29 whereby the lever may be variously weighted.

In the side of the tank a filling aperture is provided through which projects a combined inlet and valve seating member 30 provided with a pair of vertical spaced seats 31, 32 adapted to accommodate a double-beat or differential valve 33, 34. The valve rod 35 extends upward and passes through an aperture 36 in the wall 18 and is connected to a rubber or other flexible diaphragm similarly to the diaphragm 19 associated with the bucket rod. The part of the valve rod located above the diaphragm passes through guides 37 between which it is provided with a disc or flange 38 which may be adjustable on the valve rod by means of a locking screw in the sleeve of the flange. This flange is adapted to be engaged by one arm 39 of a bell-crank trip lever which is pivotally mounted, the other arm 40 extending outwardly in a more or less horizontal plane and may be weighted at its end so that the detent arm will be maintained beneath the flange 38. The horizontal arm 40 of the trip lever is adapted to be tripped by the counterbalance lever and for this purpose is provided with a bent finger 41 engaging an aperture 42 in the beam 24.

The beam 24 is conveniently formed of a pair of spaced plates and the upper end of the valve rod extends through the beam and is provided with a cross-piece 43 adapted to engage the upper edge of the beam. The edge of the beam may be inclined as at 44, to facilitate the action of the beam when raising the valve during the movement from the dotted position. Obviously, the cross-piece 43 may be mounted to rotate or be provided with an anti-friction ring.

The valve is weighted so that it will close by gravity and in the form shown in which the valve heads are formed of rubber which encases rods having flanges 45, this may conveniently be effected by a lead tube or other heavy member 46. The two valve heads are connected by a neck portion of rubber so as to provide a flexible connection permitting relative movements between the heads when seating in the seats 31, 32. In order to avoid this neck portion extending while still maintaining the flexibility, the flanges 45 are provided with tongues 45a which are connected by a wire 47.

The valve is adapted to be held closed by the pressure of the liquid acting upon the lower head 34 the area of which is larger than the head 33. The aperture in the member 30 in which the seating 31 is located is made large enough for the valve head 34 to pass through in assembling.

It will be appreciated that when the weight of liquid in the bucket equals or is slightly greater than the counterweight 27 and the siphon action is about to commence it is desirable that the apparatus shall operate quickly. In order to obtain such quick action means are provided adapted to function immediately the beam is overbalanced to impose a force which operates against the counterbalance weight 27.

According to a convenient arrangement a jockey weight 48 is mounted on the beam so as to lie normally vertically above the knife edge 25 so that it will be neutral during the normal period of balance of the beam. As soon as the counterweight 27 is overcome by the liquid in the bucket and the beam tilts towards the dotted position, the jockey weight will act in an increasing leverage in opposition to the weight 27 whereby a quick movement of the beam is produced which permits an instantaneous closing of the inlet valve and also ensures an effective syphonic action. As an aid to this quick action a rolling jockey weight 49 may be provided mounted in a runway 50 in the beam. As the position of the beam during the filling period is substantially horizontal, the runway may be provided with a slight depression at the outer end so as to retain the rolling jockey weight at such end until the tilting of the beam occurs. The normal position of the beam may be accurately adjusted by the screw 51.

In operation, assuming the parts to be in the position shown in Figure 1, liquid will flow into the tank 10 and overflow down the down flow pipe 12 and into the bucket 14 in the manner described in the specification referred to. This action continues sealing the lower end of the down flow pipe after which the liquid rises in the bucket above the lower end of the down flow pipe an amount equal to the height of liquid in the tank above the upper end of the down flow pipe. The liquid continues to flow in until the weight of liquid in the bucket overbalances the counterweight 27 when the bucket will fall and siphonic action commence resulting in the emptying of the tank and bucket. The tilting of the beam releases the detent 39, permitting the valve to close under the action of gravity.

When all the liquid in the tank 10 has siphoned over and the bucket has emptied by the siphons 15, the weight 27 will return the parts to the full line position and the action be repeated.

In order to control the operation of the apparatus so that it will function the desired number of times and then automatically become locked, whereby the delivery of a definite quantity of liquid may be effected, a trip device is provided which may be set to the desired number of operations and then function to hold the parts in the position in which the valve is closed and the tank and bucket empty.

Thus a ratchet wheel 52 is mounted for rotation upon a shaft 53. A pawl 54 is pivotally mounted on the beam and has a weighted arm 55 adapted to hold the pawl in engagement with the ratchet. Each time the apparatus functions, the pawl is raised by the beam and rotates the ratchet wheel a predetermined amount. A check pawl 56 prevents reverse movement of the ratchet wheel.

The ratchet wheel is provided with an aperture 57 adapted to accommodate a sliding bolt 58 which is moved axially under the influence of a weighted bell crank lever 59 fixed upon a rock shaft 60. The arrangement is such that the bolt normally engages the face 52a of the ratchet wheel which latter is rotated so as to set back the aperture 57 from the axis of the bolt according to the desired number of operations. Then when the ratchet wheel is rotated step by step by the pawl, the aperture finally coincides with the bolt permitting such to project through the aperture and lock the ratchet wheel.

The rock shaft carries an arm 61 for actuating a second bolt 62 adapted to be projected into the path of the beam simultaneously with the locking of the ratchet wheel, whereby the apparatus is locked after the predetermined number of operations.

Release of the mechanism may be effected by raising the weighted arm of the bell crank 59. In the apparatus illustrated in which the mechanism is enclosed by a cover 63, this is done by inserting a finger through an aperture in the wall which aperture is closed by a flexible member, such as a finger stall 64. The adjustment of the ratchet wheel 52 is effected by rotating an index wheel 65 mounted on the shaft 53 which wheel is located in proximity to the finger stall. A window 66 is provided for viewing the mechanism and index.

The bucket 14 is located in and delivers to a tank 67 having a delivery outlet for coupling to the desired plant.

In the form of apparatus used particularly for acid solutions the tanks 10 and 67 are provided with vent apertures 68 for conveying the fumes through suitable pipe lines to outside the building in which the apparatus is situated.

All the parts susceptible to attack by the acid will be formed of rubber or other suitable inert material, or covered with such material and such covering may be effected according to the method disclosed in my British Specification No. 275,316.

The vent aperture 68 in the tank 10 may be replaced by a gland 69 through which a tube 70 projects into the tank, the axis of the tube being vertically disposed. The tube is of such length that the lower end may be adjusted to occupy any position between the upper end of the down flow pipe 12 and the upper closing wall or lid 18 of the tank 10.

By sliding the tube through the gland 69 and so adjusting the lower end of the tube with regard to the upper end of the down flow pipe, the level of liquid in the tank 10 necessary to provide the desired weight of liquid in the bucket 14 may be regulated with great accuracy, as it will be appreciated that the rise in the tube to provide the necessary head after the sealing of the lower end of the latter will represent a very small quantity relatively to the bulk of the liquid being measured. Obviously the adjustment of the tube will vary with the variation of the counterbalance weight 27. The tube may be utilized as a vent to carry off the acid fumes in which case the vent 68 may be dispensed with.

The adjustable tube 70 may be of such length that the lower end can be adjusted below the top of the uptake pipe 12. With such an arrangement when the measuring tank is being filled, the liquid will first rise to the lower end of the tube and seal same. The liquid will then rise in the tube until level with the upper end of the uptake pipe 12, i. e. the amount necessary before the flow into the bucket is maintained by the air pressure in the tank. A further rise in the tube corresponding to a similar rise in the bucket will then occur, which will be determined by the counterbalance weight 27, after which the weight of liquid in the bucket will overcome the counterbalance weight and siphonic action will commence and empty the liquid from the measuring tank. This arrangement enables greater ease of calibration and a greater variation of the quantities that may be measured from a tank of given capacity.

According to a further modification, adapted to assure the quick closing of the inlet valve, the equilibrium valve is dispensed with and a valve having a single seat is employed which is operated by a weight actuated toggle mechanism. According to this arrangement (see Figure 6) a pair of toggle levers 71, 72 are provided between the upper end of the valve rod 35 and a fixed bracket disposed at a suitable height above the valve rod. The pivot 73 of the toggle is extended laterally and engaged in a slotted arm 74 of a weighted bell crank lever pivoted upon a suitable fixed bracket, the weighted arm 75 extending toward and being engaged by the arm 39 of the bell crank trip lever, when the weight is in the raised position corresponding to the valve being open. On operation of the counterbalance arm the trip 39 releases the weighted arm 75 and allows same to actuate the toggle by the slotted arm, whereby the valve is closed.

In order to raise the weight and thus open the valve again, after action of the siphon, a lever 76 is provided having a pivoted catch 77 adapted to engage the weight when the latter is in its lowest position, the pivoted catch being provided with a projection 78 adapted to lie to the right of the arm 39 when the parts are in the raised position. It will be appreciated that when the arm 39 is moved by the counterbalance arm, it will engage the projection 78 on the pivoted catch 77 and so move the latter from the weight on the toggle bell crank arm permitting instantaneous action of the valve.

The lever 76 for engaging and raising the arm 75 may itself be returned to normal position by a rod 79 carried by the lever and adapted to be engaged or connected to the counterbalance arm.

Having now described my invention, what I claim as new and desire to secure by Letters Patent is:—

1. A siphon meter comprising a measuring chamber, a down flow pipe extending into the lower portion of said chamber, a bucket associated with the lower end of said pipe to form a liquid seal therefor and adapted to be lowered by the weight of a predetermined quantity of liquid therein, a siphon mounted in the bucket for emptying the bucket, a bell enclosing the upper end of the down flow pipe to form a siphon, an operative connection between the bucket and bell whereby the bell is raised and lowered with the bucket, a fulcrumed lever, said operative connection having an extension connected to one arm of said lever, a counterweight carried by the other arm of said lever, a closure for the measuring chamber and a tube open to atmosphere extending into the upper portion of said measuring chamber, the arrangement being such that the end of the tube within the chamber is adapted to be closed by the liquid rising in the chamber, whereby the quantity of liquid necessary to provide the required head in the chamber may be determined with accuracy.

2. A siphon meter as claimed in claim 1, wherein the tube extends through said closure.

3. A siphon meter as claimed in claim 1, wherein the tube extends through said closure and is slidable relatively to the closure, whereby the end of the tube within the chamber may be adjusted as to its height therein.

4. A siphon meter comprising a measuring chamber, a down flow pipe extending into the lower portion of said chamber, a bucket associated with the lower end of said pipe to form a liquid seal therefor, a siphon mounted in said bucket for emptying the bucket, a bell enclosing the upper end of the down flow pipe to form a siphon, an operative connection between the bucket and bell, whereby the bell is raised and lowered with the bucket, a fulcrumed lever, said operative connection having an extension connected to one arm of said lever, a counterweight carried by the other arm of said lever, whereby the bucket is lowered by the weight of a predetermined quantity of liquid therein, a loaded valve controlling the supply of liquid to the measuring chamber, and an operative connection between the valve and the arm of the lever associated with the bucket, whereby on lowering the bucket the valve is substantially instantaneously closed.

5. A siphon meter comprising a measuring chamber, a down flow pipe extending into the lower portion of said chamber, a bucket associated with the lower end of said pipe to form a liquid seal therefor, a siphon mounted in said bucket for emptying the bucket, a bell enclosing the upper end of the down flow pipe to form a siphon, an operative connection between the bucket and bell, whereby the bell is raised and lowered with the bucket, a fulcrumed lever, said operative connection having an extension connected to one arm of said lever, a counterweight carried by the other arm of said lever, whereby the bucket is lowered by the weight of a predetermined quantity of liquid therein, a weighted valve controlling the supply of liquid to the measuring chamber, an operative connection between the valve and the arm of the lever associated with the bucket, a trip device for holding the valve open, and means operated by said lever to release said trip device.

6. A siphon meter comprising a measuring chamber, a down flow pipe extending into the lower portion of said chamber, a bucket associated with the lower end of said bucket to form a liquid seal therefor, a siphon mounted in said bucket for emptying the bucket, a bell enclosing the upper end of the down flow pipe to form a siphon, an operative connection between the bucket and bell, whereby the bell is raised and lowered with said bucket, a fulcrumed lever, said operative connection having an extension connected to one arm of the lever, a counterweight carried by the other arm of said lever, whereby the bucket is lowered by the weight of a predetermined quantity of liquid therein, a weighted valve controlling the supply of liquid to the measuring chamber, an operative connection between the valve and bucket, whereby the valve closes when the bucket is lowered, said valve comprising a pair of heads connected together by a flexible inextensible connection.

7. A siphon meter comprising a measuring chamber, a down flow pipe extending into the lower portion of said chamber, a bucket associated with the lower end of said pipe to form a liquid seal therefor, a siphon mounted in said bucket to empty the bucket, a bell enclosing the upper end of the down flow pipe to form a siphon, an operative connection between the bucket and bell, whereby the bell is raised and lowered with said bucket, a fulcrumed lever, said operative connection having an extension connected to one arm of said lever, a counterweight carried by the other arm of said lever, whereby the bucket is lowered by the weight of a predetermined quantity of liquid therein, a valve controlling the supply of liquid to the measuring chamber, a weight acting to close the valve, toggle mechanism connecting the lever to the valve, and means for preventing said weight operating until lowering of the bucket.

8. A siphon meter comprising a measuring chamber, a down flow pipe extending into the lower portion of said chamber, a bucket associated with the lower end of said pipe to form a liquid seal therefor, a siphon mounted in said bucket for emptying the bucket, a bell enclosing the upper end of the down flow pipe to form a siphon, an operative connection between the bucket and bell, whereby the bell is raised and lowered with the bucket, a fulcrumed lever, said operative connection having an extension connected to one arm of the lever, a counterweight carried by the other arm of said lever, whereby the bucket is lowered by the weight of a predetermined quantity of liquid therein, and means for introducing a force opposed to the counterweight when siphonic action commences, said force being additional to that produced by the liquid in the bucket.

9. A siphon meter as claimed in claim 8, wherein said means comprises a jockey weight carried by the lever, and located, prior to the commencement of siphonic action, in a neutral position vertically over the fulcrum of the lever.

10. A siphon meter as claimed in claim 8, a runway in the arm of the lever which carries the counterweight, a rolling weight mounted in the runway, and adapted to move towards the fulcrum of the lever when said lever pivots at the commencement of siphonic action.

11. A siphon meter comprising a measuring chamber, a down flow pipe extending into the lower portion of said chamber, a bucket associated with the lower end of said pipe to form a liquid seal therefor, a siphon mounted in said bucket for emptying the bucket, a bell enclosing the upper end of the down flow pipe to form a siphon, an operative connection between the bucket and bell, whereby the bell is raised and lowered with said bucket, a fulcrumed lever, a connection between one arm of said lever and the bucket, a counterweight carried by the other arm of said lever, whereby the bucket is lowered by the weight of a predetermined quantity of liquid therein, an inlet valve controlling the supply of liquid to the measuring chamber, an operative connection between the valve and the arm of the lever associated with the bucket, and locking means controlled by the lever and adapted to be projected into the path of the lever to retain the bucket in the down position corresponding to the closed position of the valve.

12. A siphon actuated meter as claimed in claim 11, wherein an index device is provided for preventing the lock functioning unless the index device occupies the zero position, means for setting the index device according to the predetermined number of times the meter is to function, and an operative connection between the index device and lever, whereby the index device is stepped back each time the lever pivots.

13. In a siphon actuated meter as claimed in claim 11, a ratchet wheel having an aperture, a pawl pivotally mounted on the lever and engaging said ratchet wheel to impart a rotary stepping movement thereto each time the lever pivots, a locking bolt adapted to engage in the aperture in the ratchet wheel to lock the wheel when the wheel is in its zero position, a locking bolt adapted to be projected into the path of the lever to lock the lever with the valve in its closed position, an operative connection between said locking bolts, whereby they function simultaneously, and means for moving the first named locking bolt into the aperture in the ratchet wheel.

14. In a siphon actuated meter as claimed in claim 11, a ratchet wheel having an aperture, a pawl pivotally mounted on the lever and engaging said ratchet wheel to impart a rotary stepping movement to the ratchet wheel each time the meter functions, a pair of locking bolts, one to engage the aperture in the ratchet wheel when the latter is in its zero position, the other to project into the path of the lever to lock the apparatus, an operative connection between the locking bolts, whereby they may be actuated simultaneously, means for actuating the ratchet wheel bolt into engagement with said aperture, a casing enclosing the apparatus and having an aperture therein, and a flexible finger-stall located in said aperture to permit manual release of the lock and resetting of the ratchet wheel.

15. A siphon actuated meter comprising a measuring chamber, an upper wall closing said chamber and having a pair of apertures, flexible diaphragms closing said apertures, a down flow pipe extending into the lower portion of said chamber, a bucket associated with the lower end of said pipe to form a liquid seal therefor, a siphon mounted in said bucket for emptying the bucket, a bell enclosing the upper end of the down flow pipe to form a siphon, a rod connecting the bucket and bell, whereby the bell is raised and lowered with the bucket, a fulcrumed lever located outside the chamber, said rod having an extension connected to one arm of the lever, said extension passing through one of the apertures in the upper wall of the casing and connected to the diaphragm associated therewith, a counterweight carried by the other arm of the lever, a valve controlling the supply of liquid to the measuring chamber, a rod for said valve extending upward through the other aperture in the wall of the casing and connected to the diaphragm associated therewith and an operative connection between said rod and the arm of the lever connected to the bucket.

16. In a siphon meter as claimed in claim 15, moulded rubber chucks carried by the bell and bucket, said chucks having apertures through which the connecting rod passes, whereby the bell and bucket are coupled together.

In testimony whereof I have signed my name to this specification.

NORMAN SWINDIN.